US012624647B2

(12) United States Patent
Goyon et al.

(10) Patent No.: US 12,624,647 B2
(45) Date of Patent: May 12, 2026

(54) TURBOMACHINE HAVING AN IMPROVED OIL-RECOVERY DEVICE

(71) Applicant: SAFRAN AIRCRAFT ENGINES, Paris (FR)

(72) Inventors: Vincent Goyon, Moissy-Cramayel (FR); Florence Irène Noëlle Leutard, Moissy-Cramayel (FR); Thomas Laurent Frederic Gauduchon, Moissy-Cramayel (FR); Antoine Lurin, Moissy-Cramayel (FR); Thierry Fachat, Moissy-Cramayel (FR); Michael Oyharcabal, Moissy-Cramayel (FR); Kevin Bolzer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/878,490

(22) PCT Filed: Jun. 28, 2023

(86) PCT No.: PCT/FR2023/050992
§ 371 (c)(1),
(2) Date: Dec. 23, 2024

(87) PCT Pub. No.: WO2024/003507
PCT Pub. Date: Jan. 4, 2024

(65) Prior Publication Data
US 2025/0389208 A1 Dec. 25, 2025

(30) Foreign Application Priority Data
Jun. 30, 2022 (FR) ...................................... 2206596

(51) Int. Cl.
*F01D 25/18* (2006.01)
*F01D 25/16* (2006.01)

(52) U.S. Cl.
CPC ......... *F01D 25/183* (2013.01); *F01D 25/162* (2013.01); *F05D 2240/56* (2013.01); *F05D 2250/294* (2013.01); *F05D 2260/98* (2013.01)

(58) Field of Classification Search
CPC .. F01D 25/183; F01D 25/162; F05D 2260/98; F05D 2250/294; F05D 2240/56
See application file for complete search history.

(56) References Cited

U.S. PATENT DOCUMENTS 4,201,426 A * 5/1980 Garten .................. F16C 35/073 417/407
6,338,578 B1 * 1/2002 Adde .................... F16C 35/073 384/906
(Continued)

FOREIGN PATENT DOCUMENTS

EP 2 090 764 A1 8/2009
EP 3 462 000 A1 4/2019
(Continued)

OTHER PUBLICATIONS

International Search Report mailed Oct. 10, 2023, issued in corresponding International Application No. PCT/FR2023/050992, filed Jun. 28, 2023, 5 pages.
(Continued)

*Primary Examiner* — Henry Y Liu
(74) *Attorney, Agent, or Firm* — CHRISTENSEN O'CONNOR JOHNSON KINDNESS PLLC

(57) ABSTRACT

A turbomachine includes an oil-recovery device having, between mutually rotatable first and second members, a tubular tab of the first member surrounded by a tubular extension of a shroud of the second member. The tab defines, with a shroud of the first member, an interface zone. The
(Continued)

tubular extension includes an outer groove opposite the tab, and the extension axially surrounds the tubular tab beyond an axial half-length of the tab. The extension has an inner diameter equal to an inner diameter of the outer shroud of the second member and has an outer diameter smaller than or equal to an outer diameter of the outer shroud. The second member has an annular groove with a rectangular cross-section.

10 Claims, 5 Drawing Sheets

(56) References Cited

U.S. PATENT DOCUMENTS

| | | | | |
|---|---|---|---|---|
| 7,128,529 | B2 * | 10/2006 | Le Jeune | F01D 25/16 416/244 A |
| 8,303,189 | B2 * | 11/2012 | Belmonte | F02C 7/28 384/537 |
| 8,312,702 | B2 * | 11/2012 | Bart | F01D 25/16 415/113 |
| 9,878,407 | B2 * | 1/2018 | Tailpied | F01D 25/16 |
| 10,344,603 | B2 * | 7/2019 | Ols | F01D 9/041 |
| 10,539,145 | B2 * | 1/2020 | Ellwood | F01M 11/02 |
| 10,781,718 | B1 * | 9/2020 | Anglin | F01D 25/183 |
| 11,021,980 | B2 * | 6/2021 | Ols | F01D 11/003 |
| 11,125,318 | B2 * | 9/2021 | Chevillot | F16H 57/0456 |
| 11,220,929 | B2 * | 1/2022 | Brault | F01D 11/00 |
| 11,268,442 | B2 * | 3/2022 | Davis | F01D 25/162 |
| 11,286,990 | B2 * | 3/2022 | Davis | F16C 33/76 |
| 11,339,724 | B2 * | 5/2022 | Di Giovanni | F16H 57/0479 |
| 11,415,045 | B2 * | 8/2022 | Levisse | F02C 3/067 |
| 11,499,447 | B2 * | 11/2022 | Lefebvre | F16C 19/54 |
| 11,725,694 | B2 * | 8/2023 | Davis | F01D 25/183 415/170.1 |
| 2009/0101444 | A1 * | 4/2009 | Alecu | F16N 39/04 184/11.2 |
| 2009/0199534 | A1 * | 8/2009 | Bart | F01D 25/18 60/39.08 |
| 2010/0046868 | A1 * | 2/2010 | Belmonte | F01D 25/24 384/286 |
| 2016/0153297 | A1 * | 6/2016 | Olds | F01D 11/02 60/722 |
| 2018/0080455 | A1 * | 3/2018 | Ellwood | F02C 6/12 |
| 2019/0360578 | A1 * | 11/2019 | Chevillot | F16H 57/0456 |
| 2019/0368393 | A1 * | 12/2019 | Edwards | F02C 7/36 |
| 2020/0024995 | A1 * | 1/2020 | Ols | F01D 9/041 |
| 2020/0116081 | A1 * | 4/2020 | Levisse | F02C 3/067 |
| 2020/0166118 | A1 * | 5/2020 | Di Giovanni | F16H 57/0482 |
| 2020/0318687 | A1 * | 10/2020 | Davis | F16J 15/442 |
| 2021/0071546 | A1 * | 3/2021 | Brault | F02C 7/28 |
| 2021/0215066 | A1 * | 7/2021 | Lefebvre | F16C 33/58 |
| 2022/0235823 | A1 * | 7/2022 | Davis | F16C 33/76 |

FOREIGN PATENT DOCUMENTS

| | | | |
|---|---|---|---|
| FR | 3 075 866 | A1 | 6/2019 |
| WO | 2014/199083 | A1 | 12/2014 |

OTHER PUBLICATIONS

Written Opinion mailed Oct. 10, 2023, issued in corresponding International Application No. PCT/FR2023/050992, filed Jun. 28, 2023, 4 pages.

* cited by examiner

TURBOMACHINE HAVING AN IMPROVED OIL-RECOVERY DEVICE

TECHNICAL FIELD OF THE INVENTION

The invention concerns a turbomachine equipped with an oil-recovery device with improved efficiency.

TECHNICAL BACKGROUND

The prior art comprises the documents WO 2014/199083 A1, EP 2 090 764 A1, EP 3 462 000 A1 and FR 3 075 866 A1.

In a turbomachine of known type, a rear portion of the low-pressure turbine shaft is rotatably mounted, generally by at least one bearing mounted on a tubular wall of the inter-turbine casing. This bearing is placed in a first enclosure referred to as lubrication enclosure, which is delimited, on the one hand, by the inter-turbine casing and, on the other hand, by a bearing support secured to the shaft of the low-pressure turbine shaft. The inter-turbine casing and the bearing support secured to the low-pressure shaft also separate this first enclosure from a second enclosure adjacent to it. The low-pressure shaft is also secured to a bearing support.

The lubrication enclosure is connected to an oil circuit comprising an oil inlet duct, through which oil is pumped into the enclosure. It comprises an oil-recovery device comprising an oil return duct, through which the oil returns towards the oil circuit in order to be pumped again.

As the inter-turbine casing is stationary and the bearing support secured to the low-pressure shaft rotates relative to the latter, the sealing of the enclosure between these two members is ensured at the level of an interface area separating the two enclosures.

The bearing support comprises an outer shell which is rotatably mounted inside an inner shell of the inter-turbine casing, and these two shells define the interface area. This interface area may be fitted with an oil flushing system comprising at least one spin and lunula device. This system may be supplemented by a dynamic sealing system, comprising a rear labyrinth seal and/or a brush seal.

Outside the lubrication enclosure, the second enclosure is pressurised. The pressurisation allows to apply a positive pressure across the interface area to prevent oil escaping from the lubrication enclosure. The pressurised enclosure also comprises a oil drainage device comprising a drainage duct communicating with the outside of the turbomachine.

To ensure the return of the lubricating oil from the bearing towards the oil return duct, the oil must be guided from the bearing to a wall of the inter-turbine casing which communicates with an inlet of an oil return duct. To achieve this, the oil must bypass the interface area without penetrating it.

For this reason, the oil-recovery device comprises a tubular tab, commonly referred to as a “dropper launcher”, which extends from the tubular wall supporting the bearing and which extends inside one end of the outer shell of the bearing support.

This tab is configured to guide the bearing when it is mounted, so that the low-pressure shaft may be precisely positioned so as to avoid any contact between the shaft and the inter-turbine casing.

This tab is also configured to conduct oil to be projected successively from the tab to the outer shell of the bearing support, then from the outer shell of the bearing support to the wall of the inter-turbine casing leading to the inlet of the oil return duct.

To prevent oil from penetrating the interface area, the outer shell of the bearing support is extended by a tubular extension which extends axially around the tubular tab beyond one end of the inner shell of the inter-turbine casing, and wherein is formed an outer annular groove of circular cross-section and concavity facing away from the tubular tab. This groove is intended to prevent oil from spreading along the tubular extension and then to the outer shell of the bearing support in the interface area.

In operation, this configuration allows the oil to bypass the interface area without entering it.

However, it has been found that a problem arises when an aircraft equipped with such a turbomachine is parked on the ground and the turbomachine is shut down.

In this case, the interface area is no longer subject to the pressurisation pressure of the second enclosure, and the turbomachine is tilted backwards by a few degrees more than in normal operation. It has been found that the oil tends to flow by gravity along the dropper launcher tab, bypass the end of the tubular extension and then by capillary action into the annular groove of circular cross-section and through the interface area, in particular by capillary action through the interface area, to finally enter the second enclosure. Under certain conditions, oil may then be evacuated out of this second enclosure by the oil drainage device and run onto the tarmac on which the aircraft is parked. Oil may even reach a hotter enclosure of the turbomachine and cause smoke to be released, which would be detrimental to the perception that users might have of the quality of the turbomachine.

There is therefore a real need for a new configuration of the oil-recovery device that allows the oil to bypass the interface area in all circumstances.

More generally, there is a real need for a new configuration of an oil-recovery device that allows to optimise the flow of oil from a tab referred to as a “dropper launcher” located close to an interface area between two members rotating relatively to each other. It will therefore be understood that the invention is not limited to the configuration described in this description.

SUMMARY OF THE INVENTION

The object of the present invention is a turbomachine equipped with an oil-recovery device which remedies the above-mentioned disadvantage. These aims are achieved, in accordance with the invention, by proposing a modification to the outer shell of the bearing support opposite the tubular tab, with an extension of larger dimensions and an outer groove of rectangular rather than circular cross-section.

To this end, the invention proposes a turbomachine comprising first and second internal members which are movable in rotation relative to each other about an axis X, and at least one guide bearing mounted between respective first and second tubular walls of axis X of the first and second members, the first member also comprising a third wall substantially transverse to the axis X, the second member comprising a fourth wall substantially transverse to the axis X surrounded by said third wall, said third and fourth walls separating two enclosures, respectively a first enclosure for lubricating the bearing and a second enclosure, the fourth wall being bordered by an outer shell of the second member and the third wall being bordered by an inner shell of the first member, the inner shell surrounding the outer shell and said inner and outer shells delimiting an interface area between said enclosures, said turbomachine further comprising an oil-recovery device comprising a tubular tab that extends the first tubular wall of the first member and which extends axially inside one end of the outer shell of the second member, this tab being configured to conduct oil to be projected successively from the tab to the outer shell of the second member, and then from the outer shell of the second member to the third wall, said inner shell of the second member being extended by a tubular extension which surrounds the outside of the tubular tab axially beyond one end of the inner shell of the first member, and wherein is formed an outer concave groove facing away from the tubular tab, characterised in that the extension surrounds the outside of the tubular tab axially beyond an axial half-length of said tubular tab, has an inner diameter equal to an inner diameter of the outer shell of the second member and of an outer diameter less than or equal to an outer diameter of the outer shell, and in that its annular groove is rectangular in cross-section.

Advantageously, the tubular extension allows the oil flowing from the tubular tab to be directed at a substantial axial distance from the interface area, and the rectangular shape of the groove in this extension allows to prevent the oil from forming a capillary bridge and reaching the interface area.

According to other characteristics of the turbomachine, the tubular extension comprises successively, starting from the outer shell of the second member:

- a first section, extending the outer shell of the second member, and having the same inner diameter and outer diameter as the inner diameter and outer diameter of said outer shell in the interface area,
- a second section, joined to the first section, with an inner diameter equal to the inner diameter of the outer shell and with an outer diameter smaller than the outer diameter of the outer shell, and
- a third section, joined to the second section, with an inner diameter equal to the inner diameter of the outer shell in the interface area, and with a specific outer diameter equal to the outer diameter of the outer shell in the interface area, the annular groove being delimited by an external wall of axis X of the second section and by transverse walls of the first and third sections at their junction with the second section,
- the first lubrication enclosure for lubricating the bearing contains lubricating oil, the external wall of axis X of the second section determines a width L of the groove, the transverse wall of the third section determines a height H of the groove, and the groove is configured such that its height H is an affine function by intervals of its width L, according to a relationship $H=m\times L+p$ whose coefficients m and p are associated with given characteristics of said lubricating oil.
- the characteristics of the lubricating oil comprise an operating temperature of less than 120° C., a viscosity of between 20 and 30 centistokes at 40° C. and 4.9 to 5 centistokes at 100° C. with a density of between 0.9 and 1.05 Kg/L,
- advantageously, the turbomachine is such that:
  - for an interval of width L greater than or equal to 4 mm and less than 6 mm, $m=-0.6$ and $p=7$,
  - for an interval of width L of 6 to 7 mm, $m=-0.2$ and $p=4.6$,
  - for a width L greater than 7 mm, $m=0$ and $p=3.2$.
- the first and second sections on the one hand, and the second and third sections on the other hand, are connected at the bottom of the groove by a radius of curvature R less than or equal to 0.6 mm,
- the third section has an axial thickness greater than or equal to 1.2 mm,
- the first member is an inter-turbine casing, the second member is a bearing support secured to a low-pressure shaft, the first bearing lubrication enclosure communicates with an oil-recovery duct connected to an oil circuit of the turbomachine, and the second enclosure is a pressurised enclosure communicating with an oil drainage duct connected to the outside of the turbomachine,
- the interface area is a area for receiving a system for flushing oil comprising a front spin and front lunulae and a rear spin and rear lunulae interposed between the inner and outer shells,
- the interface area receives behind said oil flushing system a dynamic sealing system comprising at least one dynamic seal.

BRIEF DESCRIPTION OF THE FIGURES

Further characteristics and advantages of the invention will become apparent from the following detailed description, for the understanding of which reference is made to the attached drawings wherein.

DETAILED DESCRIPTION OF THE INVENTION

Figure 1:
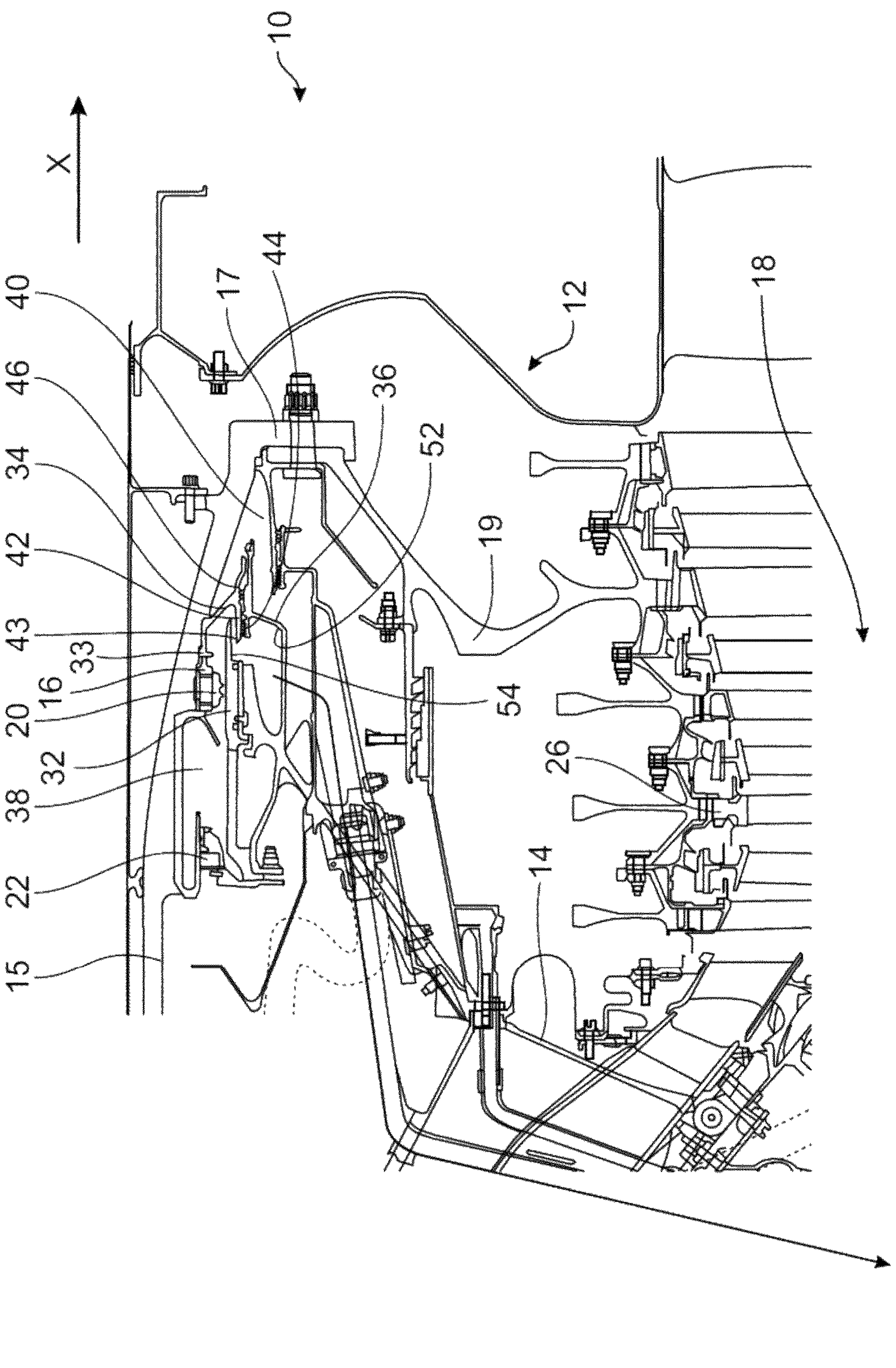
FIG. 1 is an axial cross-section of a rear portion of a turbomachine according to the prior art.

FIG. 1 shows the rear portion 12 of a turbomachine 10 produced in accordance with the prior art. In a known way, the turbomachine comprises respective first and second internal members 14, 16 movable in rotation relative to each other about an axis X and at least one guide bearing 20 mounted between the first and second members.

In the present case, the invention relates in particular to the case of an inter-turbine casing 14 internally rotatably receiving a low-pressure shaft 15 via a bearing support 16 secured to this low-pressure shaft 15. The low-pressure shaft also comprises a rear end carrying a trunnion 19 of a low-pressure turbine 18.

It will be understood that this arrangement, which is the subject of the present description, is not restrictive of the invention and that the invention may be applied to other members mounted for rotation relative to one another, such as, for example, bearing supports secured to low-pressure turbine and high-pressure turbine trunnions.

A segmented radial seal 22 is also mounted between the inter-turbine casing 14 and the low-pressure shaft 15.

The inter-turbine casing 14, which forms the first member here, is a substantially annular casing which is passed through by a primary gas vein 24 of the turbomachine.

Turbine disks 26, secured to the low-pressure turbine trunnion 16, are also placed in the gas vein 24 and their vanes 28 are arranged alternately with stator vanes 30.

The inter-turbine casing 14 comprises a first tubular wall 32 of axis X and the bearing support 16 comprises a second tubular wall 33, the bearing 20 being mounted between these walls 32, 33.

The inter-turbine casing 14 also comprises a third wall 36, substantially transverse to the axis X The bearing support 16, which here forms the second member, comprises a fourth wall 34, substantially transverse to the axis X, which is surrounded by the third wall 36 of the inter-turbine casing 14. The fourth wall 34 therefore rotates inside the third wall 36, which is stationary.

The inter-turbine casing 14, the low-pressure shaft 15 and the bearing support 16 delimit a first lubrication enclosure 38 for lubricating the bearing comprising lubricating oil inside the rear portion 12 of the turbomachine 10. In addition, these fourth and third walls 34, 36 separate the first lubrication enclosure 38 for lubricating the bearing from a second enclosure 40, outside the first enclosure 38.

The fourth wall 34 is bordered by an outer shell 42, which also forms part of the bearing support 16, and the third wall 36 is bordered by an inner shell 44, which forms part of the inter-turbine casing 14.

The two shells 42, 44 are arranged opposite each other, with the inner shell 44 surrounding the outer shell 42. As a result, the two outer 42 and inner 44 shells delimit an interface area 46 between the two enclosures 38, 40.

Conventionally, the second enclosure 40 is a pressurised enclosure supplied with pressurised air taken from a tap on one of the compressors of the turbomachine. This enclosure 40 is pressurised so as to exert a positive pressure on the interface area 46, wherein a system for flushing oil comprising at least one spin and lunulae may be housed, in a manner that is not restrictive of the invention, which may be supplemented inside or outside the interface area 46 by a dynamic sealing system such as a labyrinth or brush seal ensuring the sealing between the lubrication enclosure 38 and the second enclosure 40.

As none of these systems is limiting of the invention, it will be considered in the remainder of this description that the interface area 46 comprises only a system for flushing oil.

The purpose of pressurising the enclosure 40 is to confine the lubricating oil from the bearing 20 inside the lubrication enclosure 38. This second enclosure 40 also comprises an oil drainage duct 41, which communicates with the outside of the turbomachine.

The lubricating oil is pumped under pressure into the lubrication enclosure 38 via an oil inlet duct 48 and is recovered by an oil-recovery device which allows the oil to be evacuated from the lubrication enclosure via a duct 50, so that it may be recovered and then pumped back inside this enclosure 38. To reach the duct 50, as shown by the arrows in FIG. 1, the lubricating oil coming from the bearing 20 must first reach an internal face 52 of the third wall 36 of the inter-turbine casing 14, from where it is routed to the inlet of the duct 50. Note that in the plan shown in FIG. 1, the duct 50 is represented by dotted lines.

Figure 3:
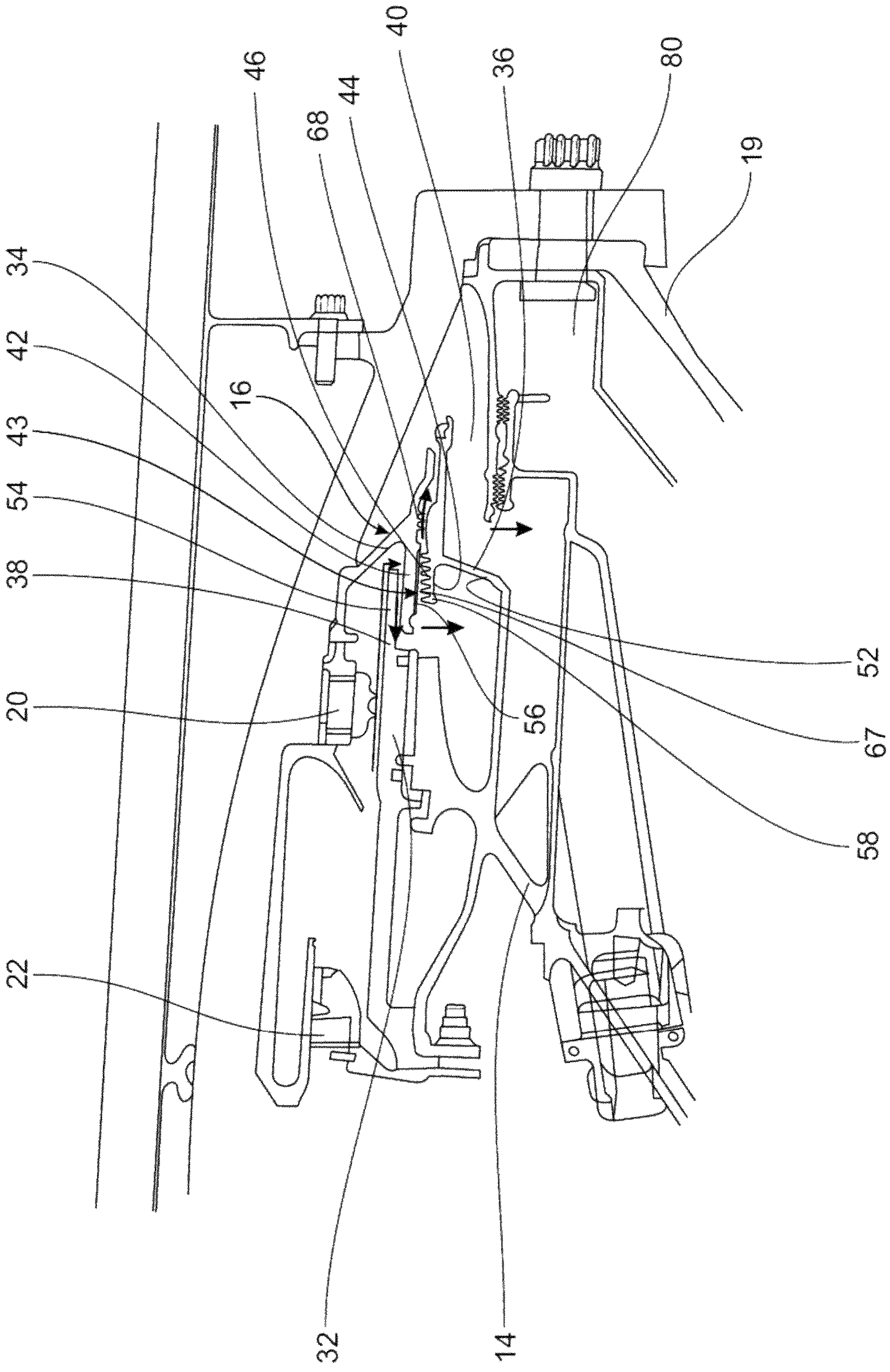
FIG. 3 is a cross-sectional view of the rear portion of a turbomachine according to the prior art, illustrating the lubricating oil path.
Figure 4:
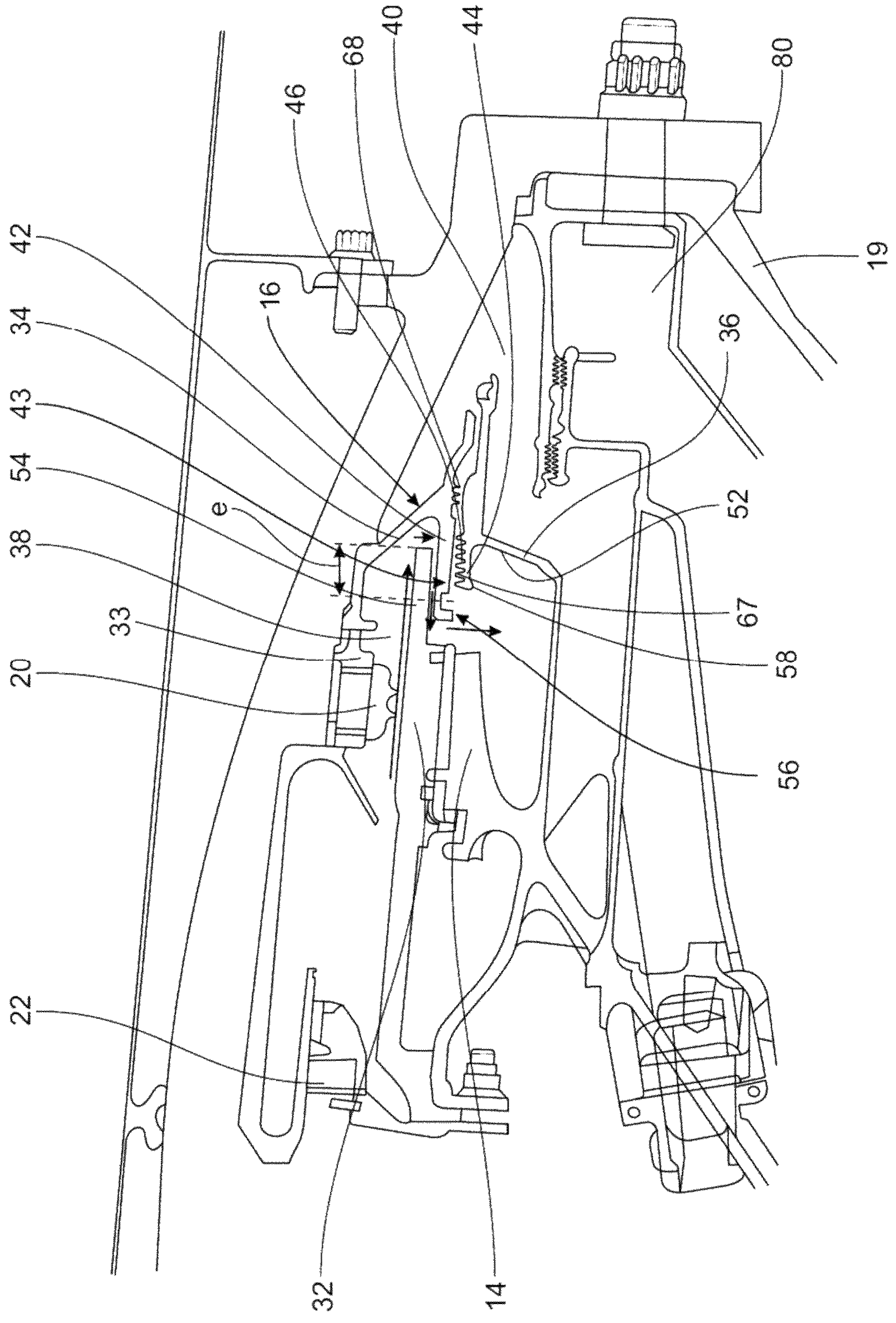
FIG. 4 is an axial cross-sectional view of an extension of an outer shell of a bearing support of a turbomachine according to the invention.

To this end, as illustrated in greater detail in FIG. 3, the oil-recovery device also comprises a tubular tab 54 which extends from the first tubular wall 32 of the inter-turbine casing 14 and which extends axially towards the outer shell 42 of the bearing support 16, and more particularly inside one end 43 thereof.

This tab 54 is configured to guide the bearing 20 when it is mounted, to allow the low-pressure shaft 15 to be positioned precisely so as to avoid any contact between the shaft 15 and the inter-turbine casing 14.

In a known way, when the turbomachine is operating, oil is projected successively from the tab 54 to the outer shell 42 of the bearing support 16, then from the outer shell 42 of the bearing support 16 to the inner surface 52.

In a known manner, the end 43 of the inner shell 42 of the bearing support 16 is extended by a tubular extension 56 which extends axially and partially around the tubular tab 54. This extension 56 extends beyond one end 58 of the inner shell 44 of the inter-turbine casing 14, and is therefore not arranged in the interface area 46, but is placed outside it. An outer groove 60 is formed in this extension 56, the concavity of which faces away from the tubular tab 54.

Figure 2:
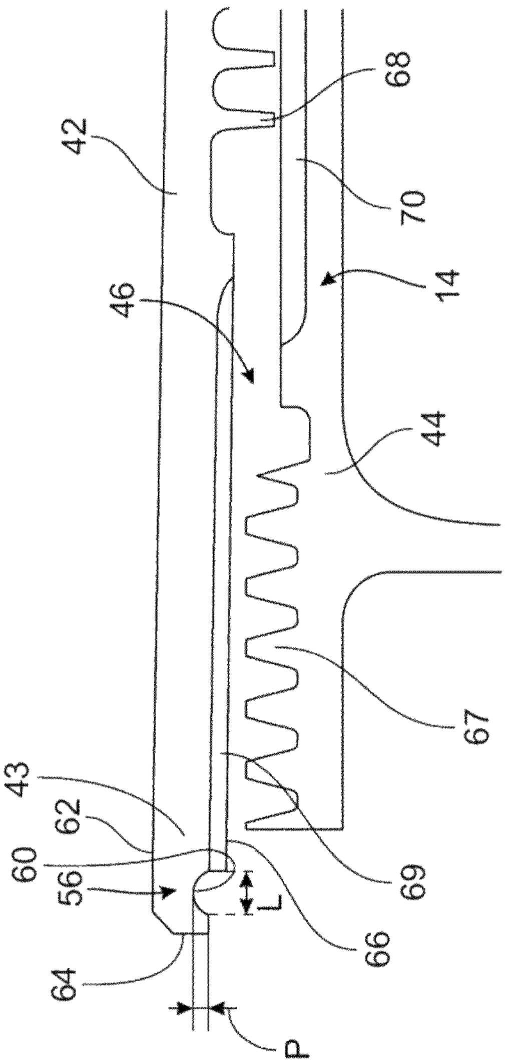
FIG. 2 is an axial cross-sectional view of an extension of an outer shell of a bearing support of the turbomachine of FIG. 1.

An extension 56 of this type in accordance with the prior art is shown in FIG. 2. As may be seen, the extension 56 has substantially the same inner and outer diameters as the outer shell 42 of the bearing support 16 and its groove 60 is of a specific width L and depth P. The groove 60 has a circular cross-section.

In such a configuration, it has been observed that, when the turbomachine is at a standstill, for certain angles of inclination, corresponding for example to an inclination of the turbomachine of approximately 4°, which is typically an inclination of an under-wing turbomachine in the parked position of the aircraft, the oil coming from the tubular tab 54 drips onto the internal wall 62 of the extension 56 and then, flowing onto its end face 64, not only drips from the end face 64 but also tends to penetrate by capillary action into the groove 60 to form a lubricant bridge from where it propagates against an external wall 66 of the inner shell 42 of the support 16 until it reaches the interface area 46. When the interface area 46 is equipped with a system for flushing oil, such as a double system comprising a front spin 67 and front lunulae 69 and a rear spin 68 and rear lunula 68, the oil may pass through this system and then enter the second enclosure 40 from where it may be evacuated via the drainage duct 41.

The invention proposes a modification to the extension 56 allowing to overcome this problem.

Figure 5:
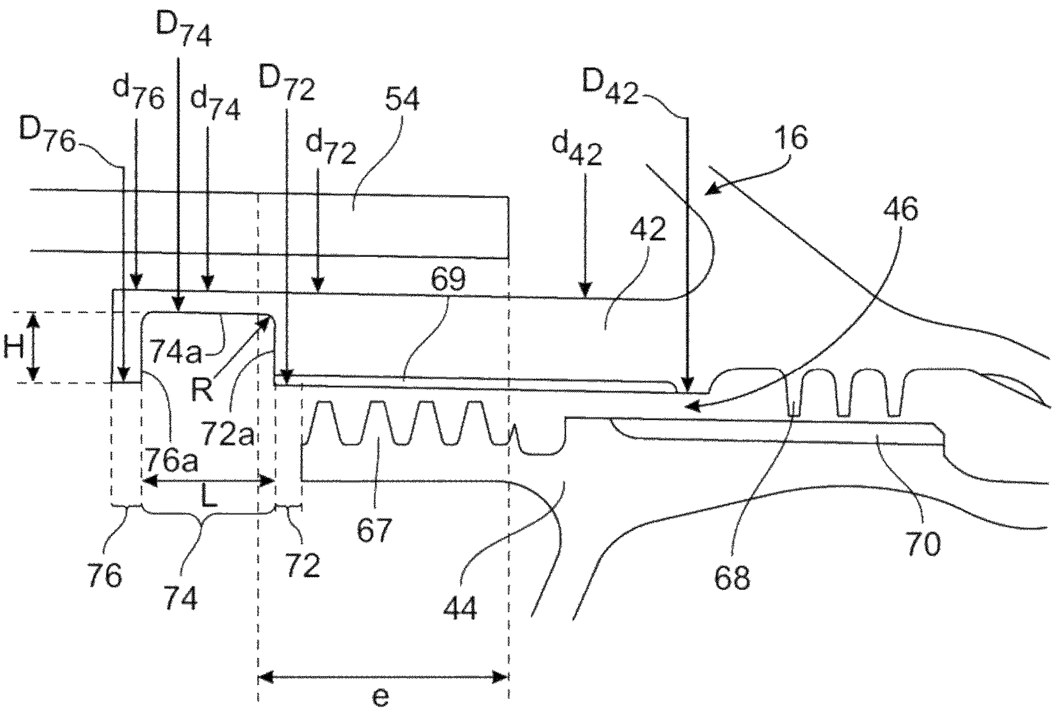
FIG. 5 is a cross-sectional view of the rear portion of the turbomachine according to the invention, illustrating the path of the lubricating oil.
Figure 6:
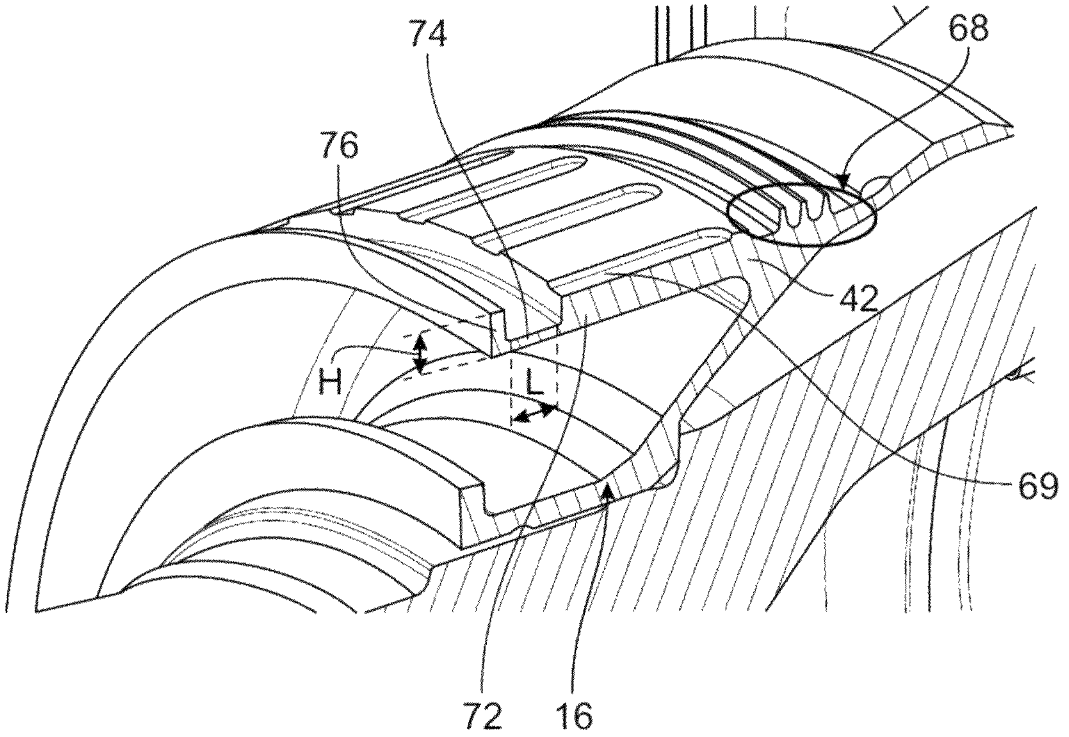
FIG. 6 is a perspective view of the end of the outer shell of the bearing support and its extension.

To this end, as illustrated in FIGS. 2 and 5, the extension 56 first extends beyond the axial half-length l of the tubular tab 54.

Furthermore, as shown in FIG. 5, the extension 56 surrounds the outside of the tubular tab 54 axially beyond the axial half-length l of the tubular tab 54. It has an inner diameter equal to an inner diameter of the outer shell 42 of the second member 16 and an outer diameter less than or equal to an outer diameter of the outer shell, and its annular groove 60 is rectangular in cross-section.

The free end of the extension 56 thus forms a return which, combined with the rectangular shape of the cross-section of the outer annular groove 60, prevents the oil from forming a bridge by capillary action through this annular groove 60 to reach the interface area 46. Unlike a groove with a circular cross-section, a groove with a rectangular cross-section allows to break the continuity of the oil film and prevents it from spreading through the annular groove 60.

More particularly, as illustrated in FIG. 5, the tubular extension 56 comprises, in succession, starting from the outer shell 42 of the support 16, a first section 72, a second section 74 and a third section 76.

The first section 72 extends the outer shell 42 of the support 16, and has the same inner diameter $d_{72}$ and outer diameter $D_{72}$ as the inner diameter $d_{42}$ and outer diameter $D_{42}$ of the outer shell 42 in the interface area 46

The tubular extension then comprises a second section 74, joined to the first section 72.

The second section 74 has an inner diameter $d_{74}$ equal to the inner diameter $d_{42}$ of the outer shell 42 in the interface area 46, and an outer diameter $D_{74}$ smaller than the outer diameter $D_{42}$ of the outer shell 42 in the interface area 46.

Finally, the third section 76, joined to the second section 74, has an inner diameter $d_{74}$ equal to the inner diameter $d_{42}$ of the outer shell 42, and a specific outer diameter $D_{76}$ equal to the outer diameter $D_{42}$ of the outer shell 42.

It will therefore be understood that the second and third sections 74, 76 thus form a recess which extends axially outside the tubular tab 54 beyond the axial half-length l of this tubular tab 54. The axial dimensions of the first to third sections 72, 74, 76 therefore determine the coverage of the tubular extension 56 around the tubular tab 54 beyond the axial half-length l.

It will also be understood that the annular groove 60 of rectangular cross-section is delimited by an external wall 74*a* of axis X of the second section 74 gripped between respective transverse walls 72*a* and 76*a* of the first and third sections 72, 76 at their junction with the second section 74.

The dimensions of the groove 60 are decisive in terms of its ability to prevent the formation of a lubricant bridge across it. The external wall 74*a* of axis X of the second section 74 determines a width L characteristic of the groove 60, and the transverse wall 76*a* of the third section 76 determines a height H characteristic of the groove 60.

In accordance with the invention, the groove 60 is configured such that its height H is an affine function by intervals of its width L, according to a relationship of the type $H=m\times L+p$, the coefficients m and p of which are associated with specific characteristics of the lubricating oil.

In the context of the invention, the characteristics of the lubricating oil used to lubricate the bearing 20 comprise an operating temperature of less than 120° C., a viscosity of between 20 and 30 centistokes at 40° C. and 4.9 to 5 centistokes at 100° C. with a density of between 0.9 and 1.05 Kg/L.

For such a lubricating oil, in accordance with the invention, the coefficients m and p of the affine function determining the height H of the groove 60 as a function of its width L vary as a function of three intervals:

for an interval of width L greater than or equal to 4 mm and less than 6 mm, $m=-0.6$ and $p=7$, for an interval of width L of 6 to 7 mm, $m=-0.2$ and $p=4.6$, and finally, for a width L greater than 7 mm, $m=0$ and $p=3.2$, which corresponds to a constant height H of the groove 60.

Another important parameter of the groove 60 is the radius of curvature of the sections 72 to 76. In order to break the oil film, the radius of curvature allowing to connect these sections must be as small as possible in order to provide a groove 60 with a cross-section as close as possible to a perfect rectangle. The first and second sections 72, 74 on the one hand, and the second and third sections 74, 76 on the other, are connected at the bottom of the groove by a radius of curvature R less than or equal to 0.6 mm.

It is also essential that the third section 76 has a minimum thickness $E_{76}$, so as to prevent oil from passing over its free end 78. To this end, the third section 76 has a thickness $E_{76}$ greater than 1.2 mm.

Advantageously, the extension 56 may be arranged radially with respect to the tubular tab 54 with a reduced clearance, a reduced clearance allowing to limit the speed of the oil flow.

Advantageously, the invention allows to prevent oil from passing through the interface area 46 when the turbomachine is at standstill, with a given angle of inclination of up to 4°, regardless of whether this area is configured to receive an oil flushing system such as the spin 67, 68 and lunulae 69, 70 or another system. It therefore prevents oil from spilling onto the tarmac via the drainage duct 41 or seeping into other hotter enclosures of the turbomachine, such as an enclosure 80, with the attendant risks of smoke development, which would be detrimental to the perception that users might have of the quality of the turbomachine.

The invention claimed is:

1. A turbomachine comprising first and second internal members which are movable in rotation relative to each other about an axis X, and at least one guide bearing mounted between respective first and second tubular walls of axis X of the first and second members, the first member comprising a third wall transverse to the axis X, the second member comprising a fourth wall transverse to the axis X surrounded by said third wall, said third and fourth walls separating two enclosures, respectively, a first enclosure configured to lubricate the bearing, and a second enclosure, the fourth wall being bordered by an outer shell of the second member, and the third wall being bordered by an inner shell of the first member, the inner shell surrounding the outer shell and said inner and outer shells delimiting an interface area between said enclosures, said turbomachine further comprising an oil-recovery device comprising a tubular tab which extends the first tubular wall of the first member and which extends axially inside one end of the outer shell of the second member the tab being configured to conduct oil to be projected successively from the tab to the outer shell of the second member, and then from the outer shell of the second member to the third wall, said inner shell of the second member being extended by a tubular extension which surrounds the outside of the tubular tab axially beyond one end of the inner shell of the first member, and wherein is formed an outer concave groove facing away from the tubular tab, wherein the extension surrounds the outside of the tubular tab axially beyond an axial half-length of said tubular tab, has an inner diameter equal to an inner diameter of the outer shell of the second member and an outer diameter less than or equal to an outer diameter of the outer shell, and an annular groove of the second member is rectangular in cross-section.

2. The turbomachine according to claim 1, wherein the tubular extension comprises successively, starting from the outer shell of the second member:

a first section, extending the outer shell of the second member, and having the same inner diameter and outer diameter as the inner diameter and outer diameter of said outer shell in the interface area, a second section, joined to the first section, with an inner diameter equal to the inner diameter of the outer shell in the interface area, and with an outer diameter smaller than the outer diameter of the outer shell in the interface area, and a third section, joined to the second section, with an inner diameter equal to the inner diameter of the outer shell, and with a specific outer diameter equal to the outer diameter of the outer shell, the annular groove being delimited by an external wall of axis X of the second section and by transverse walls of the first and third sections at their junction with the second section.

3. The turbomachine according to claim 2, wherein the first lubrication enclosure contains lubricating oil, and the external wall of axis X of the second section determines a width L of the groove, in that the transverse wall of the third section determines a height H of the groove, and the groove is such that the height H is an affine function by intervals of its width L, according to a relationship $H=m\times L+p$ whose coefficients m and p are associated with given characteristics of the lubricating oil.

4. The turbomachine according to claim 3, wherein characteristics of the lubricating oil comprise an operating temperature of less than 120° C., a viscosity of between 20 and 30 centistokes at 40° C. and 4.9 to 5 centistokes at 100° C. with a density of between 0.9 and 1.05 Kg/L.

5. The turbomachine according to claim 4, wherein:

for an interval of width L greater than or equal to 4 mm and less than 6 mm, $m=-0.6$ and $p=7$, for an interval of width L of 6 to 7 mm, $m=-0.2$ and $p=4.6$, and for a width L greater than 7 mm, $m=0$ and $p=3.2$.

6. The turbomachine according to claim 4, wherein the first and second sections on the one hand, and the second and third sections on the other hand, are connected at the bottom of the groove by a radius of curvature R less than or equal to 0.6 mm.

7. The turbomachine according to claim 4, wherein the third section has an axial thickness greater than or equal to 1.2 mm.

8. The turbomachine according to claim 1, wherein the first member is an inter-turbine casing, in that the second member is a bearing support secured to a low-pressure shaft, the first bearing lubrication enclosure communicating with an oil-recovery duct connected to an oil circuit of the turbomachine, and the second enclosure is a pressurized enclosure communicating with an oil drainage duct connected to the outside of the turbomachine.

9. The turbomachine according to claim 8, wherein the interface area is an area for receiving configured to receive a system for flushing oil comprising a front spin and front lunulae and a rear spin and rear lunulae interposed between the inner and outer shells.

10. The turbomachine according to claim 8, wherein the interface area is an area for receiving a sealing system comprising at least one dynamic seal.

* * * * *